Oct. 11, 1932.  E. F. LONG  1,881,756
MAIN SPRING TESTER
Filed March 17, 1930
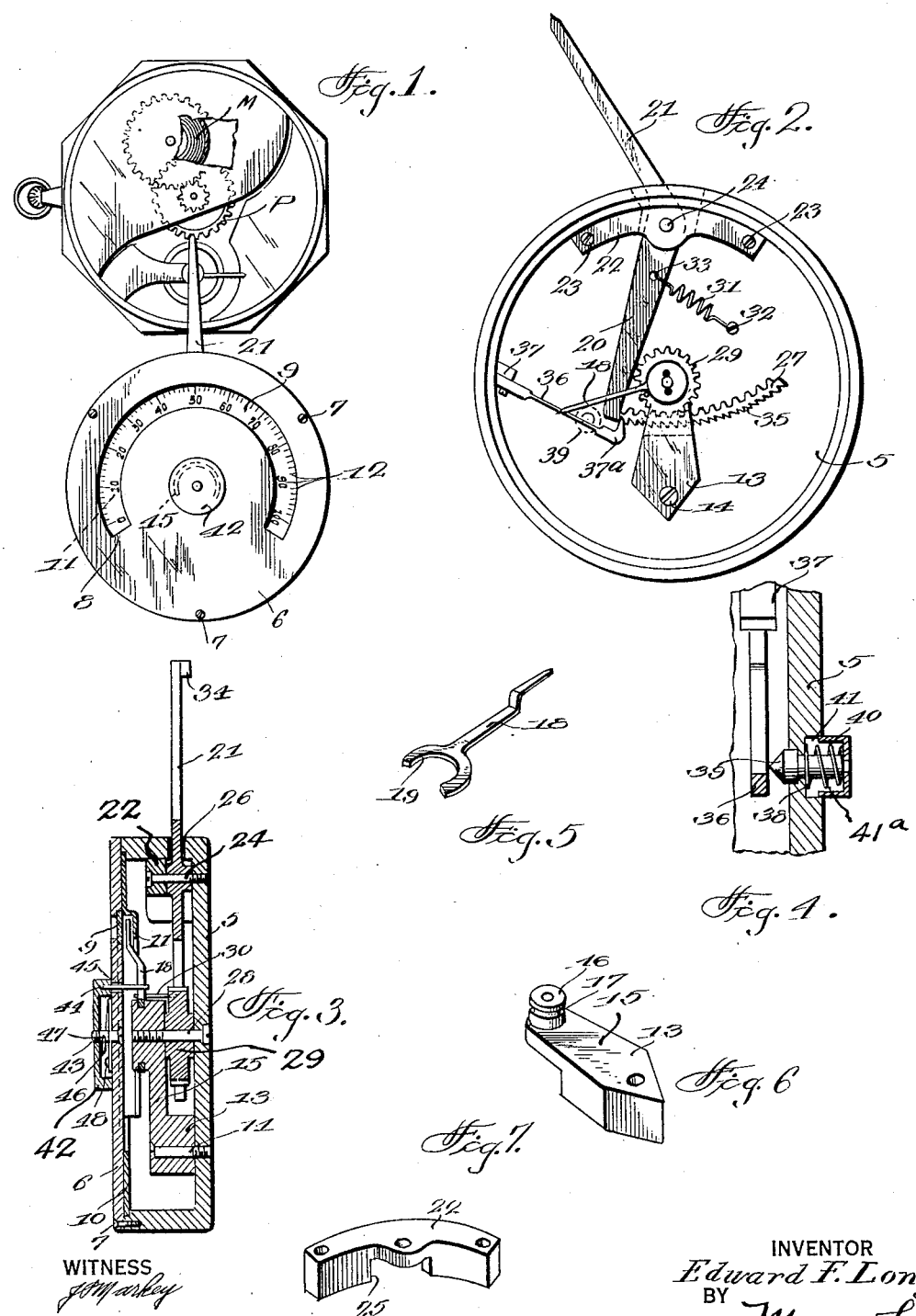
INVENTOR
Edward F. Long
BY
Munn & Co.
ATTORNEY Patented Oct. 11, 1932

1,881,756

UNITED STATES PATENT OFFICE

EDWARD FRANKLIN LONG, OF SPARTANBURG, SOUTH CAROLINA

MAIN SPRING TESTER

Application filed March 17, 1930. Serial No. 436,561.

My invention is a main spring tester and has as one of its objects the provision of a device whereby the motive power of a main spring of a watch or other horological instrument may be accurately determined.

A further object of the invention is to provide a hand instrument of this character which embodies a graduated scale and a movable indicator to be operatively connected with one of the gears of a watch or other horological instrument so that the strength or motive power of the main spring will be transmitted to the indicator to move the same over the scale and thereby accurately measure the motive power of the main spring.

The invention also contemplates a spring force measuring device wherein the indicating element will be automatically latched in operated position and cannot return to zero position until manually released.

With the preceding and other objects and advantages in mind, the invention consists in the novel combination of elements, constructions and arrangements of parts and operations to be hereinafter more fully described, claimed and illustrated in the accompanying drawing, wherein:

Figure 1 is an elevation of the invention in operative position to test the motive power of a watch main spring;

Fig. 2 is an elevation of the instrument with the cover plate removed to show the interior mechanism;

Fig. 3 is a sectional view of the invention;

Fig. 4 is a fragmentary detail view of the latch embodied in the invention;

Fig. 5 is a perspective view of the indicating hand; and

Fig. 6 is a perspective view of one of the elements of the invention;

Fig. 7 is a perspective view of another part of the invention.

Referring to the invention in detail a circular casing 5 having a removable side wall 6 which is secured in place by removable fastenings 7, is provided. The removable wall 6 is provided with a crescent-shaped slot 8 and held therein is a transparent strip or window 9.

Held between the removable wall 6 and the side walls of the casing 5 is a disk 10 which is formed with an offset flange 11 which is also crescent-shaped and is disposed in parallelism with the window 9. Graduations 12 are provided on the outer face of the flange 11 and are visible through the window 9.

Arranged within the casing is a body 13 which is secured to the rear wall of the casing by a fastening 14. As disclosed in Fig. 3 the body 13 is formed with an upstanding arm 15 which is spaced from the rear wall of the casing. A cylindrical boss 16 is formed on the outer face of the arm 15 and is provided with a circumferential groove 17. An indicating hand 18 is adapted for movement about the graduated flange 11 and as shown in Fig. 5 one end of this indicating hand is formed with a yoke 19. The yoke 19 is received within the groove 17 and has sufficient frictional engagement therewith as to normally hold the indicating hand stationary.

Means are provided for taking off power from one of the pinions P of the watch to measure the motive power of the main spring M and which comprises a bell crank lever having one leg 20 arranged within the casing 5 to one side of the body 13 and its other leg 21 extended from the casing at an angle thereto as disclosed in Fig. 2. An arcuate mounting 22 is provided for the bell crank lever and is secured in place by removable fastenings 23. At a point intermediate the ends the bell crank lever is pivotally supported on a pivot 24 which extends transversely through the mounting 22 and is engaged with the rear wall of the casing. To permit pivotal movement of the bell crank lever the mounting is provided with an elongated recess 25 while the casing is provided with a slot 26 in registration therewith.

The inner end of the leg 20 of the bell crank lever carries a longitudinally curved rack bar 27 which extends in a direction laterally of the leg 20 and is movable between the arm 15 and rear wall of the casing. Extending transversely through the outer end of this arm 15 and engaged with the rear wall of the casing is a shaft 28 upon which a pinion 29 is rotatably mounted, the latter being engaged by the longitudinally curved rack bar 27.

For the purpose of moving the indicating hand on its axis a laterally projecting pin 30 is carried by the front face of the pinion 29 and is located in the path of the indicating hand 18.

For the purpose of resisting the expansion of the main spring M of the watch, a contractile spring 31 is provided and has one end anchored to the rear wall of the casing as at 32 and its opposite end engaged with the leg 20 of the bell crank lever slightly below its axis as indicated at 33.

In testing the power of the spring M the free end of the leg 21 of the bell crank lever is adapted to be engaged with the teeth of the pinion P and for this purpose a bevelled lug 34 is formed on one face of this free end of the leg 21.

In order to automatically latch the indicating hand in actuated position the under face of the rack bar 27 is formed with ratchet teeth 35. A resilient arm 36 is supported at right angles to the inner end of the leg 20 of the bell crank lever from a lug 37 carried by the inner face of the side walls of the casing. At its free end the resilient arm is formed with a pawl 37ª which is resiliently held against the ratchet teeth 35. It will be seen that upon movement of the leg 20 away from the arm 15 the ratchet teeth will successively engage the pawl 37ª. Thus the pinion 29 will be positively held against accidenttal rotation and consequently the pin 30 will be held against the indicating hand 18 and hold it in adjusted position. It will therefore be manifest that the indicating hand will always give a true reading.

In order to disengage the pawl 37ª from the ratchet teeth a spring pressed plunger 38 is slidably mounted in the rear wall of the casing to one side of the resilient arm 36. The inner end of the plunger is formed with a pointed head 39 which contacts with the resilient arm and its purpose is to move the latter laterally to disengage the pawl 37 from the ratchet teeth. As the plunger is pressed inwardly the pointed head will slide off the resilient arm 36 to prevent undue strain on the latter. In other words the head will move the arm just enough to disengage the pawl from the ratchet teeth. A finger engaging element 40 is carried by the outer end of the spring pressed plunger and is movable into a circular recess 41 in the outer face of the rear wall of the casing, against the action of a spring 41a.

When it is desired to test the motive power of the horological instrument the device is held in one hand with the lug 34 engaged with the pinion P. The force or expansion of the spring M is transmitted to the bell crank lever and is resisted by the action of the contractile spring 31. As the pinion is rotated the leg 21 of the bell crank lever is moved to the left and through the instrumentality of the rack bar 27 drives the pinion 29 in a clock-wise direction. The pin 30 moving with the pinion contacts with the indicating hand and moves the same around the graduated scale until the contractile spring 31 overcomes the action of the main spring end. The position of the indicating hand on the dial will then indicate the motive power of the main spring.

For the purpose of resetting the indicating hand after each operation of the device a rotating finger engaging element 42 is mounted on a stud 43 projecting laterally from the center of the removable wall 6. This rotatable member carries a laterally extending pin 44 which passes through the crescent-shaped slot 45 which is arranged concentric to the slot 8. As shown in Fig. 3 this pin projects into the path of the indicating hand so that upon turning of the member 42 in a counter-clockwise direction the indicating hand will be moved to the zero position. To normally urge the rotatable member 42 to a position where the pin 44 will not engage the indicating hand 18 a helical spring 46 is arranged within the finger engaging member and has one end anchored to the stud as at 47 and its opposite end anchored to the wall 6 as at 48.

What is claimed is:

1. In a device of the character described, a body having a graduated scale thereon, a lever pivotally supported on the body and having one end projecting therefrom for engagement with one of the gear wheels of a horological instrument, a spring connected with the lever to urge the same in a direction opposite to the direction of rotation of the gear, a pivotally mounted indicating element movable over the scale, a rack bar attached to one end of the lever and extending laterally therefrom, a pinion supported on the body and engaged by the rack bar, and a pin projecting from the pinion and disposed in the path of the indicating element to move the latter over the scale incident to the movement of the lever in one direction.

2. In a device of the character described, a body having a graduated scale thereon, a lever pivotally supported on the body and having one end projecting therefrom for engagement with one of the gear wheels of a horological instrument, a spring connected with the lever to urge the same in a direction opposite to the direction of rotation of the gear, a pivotally mounted indicating element movable over the scale, a rack bar attached to one end of the lever and extending laterally therefrom, a pinion supported on the body and engaged by the rack bar, and a pin projecting from the pinion and disposed in the path of the indicating element to move the latter over the scale incident to the movement of the lever in one direction, and a manually releasable latch on the body for holding the lever in actuated position.

3. In a device of the character described, a casing, a lever pivotally supported intermediate its ends in the casing and having one end projecting therefrom and adapted to be engaged with one of the gears of a horological instrument, a spring connected with the lever and operable to resist movement of the latter in one direction, said casing having a graduated scale thereon, an indicating hand movable over the scale and means operable by the other end of the lever for moving said hand over said scale.

4. In a device of the character described, a casing, a lever pivotally supported intermediate its ends in the casing and having one end projecting therefrom and adapted to be engaged with one of the gears of a horological instrument, a spring connected with the lever and operable to resist movement of the latter in one direction, said casing having a graduated scale thereon, an indicating hand movable over the scale, means operable by the lever for moving said hand, a resilient latch in the casing and adapted to hold the lever in actuated position, and a laterally movable member supported at one side of the latch and manually operable to disengage the latter from the lever.

5. In a device of the character described, a casing having a graduated scale thereon, a bell crank lever pivotally supported therein and having one leg projecting therefrom and adapted to be engaged with one of the gears of a spring motor, a spring connected with the other leg and urging the lever in a direction opposite to the direction of rotation of such gear, a rack bar carried by the last mentioned leg of the lever, a pinion rotatably supported within said casing to one side of the rack bar and engaged by the latter, an indicating hand rotatably mounted in the casing, and a pin projecting from the pinion and disposed in the path of the indicator and operable to move the same over the scale when the bell crank lever is moved in one direction.

6. In a device of the character described, a casing having a graduated scale thereon, a bell crank lever pivotally supported therein and having one leg projecting therefrom and adapted to be engaged with one of the gears of a spring motor, a spring connected with the other leg and urging the lever in a direction opposite to the direction of rotation of such gear, a rack bar carried by the last mentioned leg of the lever, a pinion rotatably supported within said casing to one side of the rack bar and engaged by the latter, an indicating hand rotatably mounted in the casing, a pin projecting from the pinion and disposed in the path of the indicator and operable to move the same over the scale when the bell crank lever is moved in one direction, and a manually releasable latch in the casing and engageable with the rack bar to hold the same against movement when the bell crank lever has been moved in one direction.

7. In a device of the character described, a casing, a bell crank lever pivotally mounted therein and having one leg extending laterally therefrom and adapted to be engaged with one of the gears of a spring motor, a spring connected with the other leg of the bell crank lever to resist movement of the latter in one direction, a rack bar attached to said leg and extending laterally therefrom, a pinion supported within said casing to one side of the rack bar and engaged by the latter, a pin projecting from the pinion, an indicating element pivotally supported on the casing with its axis concentric with the axis of the pinion and moved in one direction by the pin as the pinion is rotated in one direction, said casing being provided with a scale over which the indicator moves, and a rotatable indicating hand resetting device on the casing having a laterally projecting part which is disposed in the path of movement of the indicating hand, and is engageable with the same to move it to normal position.

EDWARD FRANKLIN LONG.